United States Patent
Jinnai

(12)
(10) Patent No.: US 6,543,994 B2
(45) Date of Patent: Apr. 8, 2003

(54) VARIABLE-CAPACITY TURBINE

(75) Inventor: Yasuaki Jinnai, Kanagawa-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/767,845

(22) Filed: Jan. 24, 2001

(65) Prior Publication Data
US 2001/0017032 A1 Aug. 30, 2001

(30) Foreign Application Priority Data
Jan. 24, 2000 (JP) .................................... 2000-013597

(51) Int. Cl.[7] .............................................. F01D 17/12
(52) U.S. Cl. ........................ 415/160; 415/150; 415/164
(58) Field of Search ................................. 415/150, 160, 415/164, 163, 165, 158; 60/602; 417/407

(56) References Cited

U.S. PATENT DOCUMENTS

| | | | | |
|---|---|---|---|---|
| 4,643,640 A | * | 2/1987 | Burdette et al. | ............. 415/164 |
| 5,146,752 A | * | 9/1992 | Bruestle | ..................... 415/164 |
| 5,851,104 A | * | 12/1998 | Dakin et al. | ................. 415/150 |
| 6,312,217 B1 | * | 11/2001 | Takahashi | ................... 415/160 |

FOREIGN PATENT DOCUMENTS

| | | | | |
|---|---|---|---|---|
| JP | 409296731 A | * | 11/1997 | |
| JP | 410331649 A | * | 12/1998 | |
| JP | 11062603 A | * | 3/1999 | |
| JP | 02000008870 A | * | 1/2000 | |
| JP | 2001073787 A | * | 3/2001 | |
| JP | 02001329851 A | * | 11/2001 | |

* cited by examiner

Primary Examiner—Thomas Denion
Assistant Examiner—Thai Ba Trieu
(74) Attorney, Agent, or Firm—Wenderoth, Lind & Ponack, L.L.P.

(57) ABSTRACT

Exhaust gas that is supplied to a turbine, but without going through channels between nozzle vanes provided in a variable-capacity turbocharger, is eliminated. A nozzle unit 100 in turbocharger 10 has a mounting plate 102 and a side plate 106 installed in a recess 20a provided in a housing 20 such that the side plate can move in the recess. A pushing mechanism 116 or 150 pushes the side plate toward the mounting plate 102. A movement limit 108 limits the movement of the side plate parallel to the turbine shaft toward the mounting plate 102.

7 Claims, 7 Drawing Sheets

PRIOR ART

VARIABLE-CAPACITY TURBINE

BACKGROUND OF THE INVENTION

1. Field of the Invention

This invention concerns a variable-capacity turbocharger. More specifically, it concerns an improvement of a nozzle unit for supplying exhaust gases to a turbine of the turbocharger.

2. Description of the Related Art

A turbocharger is an effective means to increase the output of an internal combustion engine. A turbine is rotated by the exhaust gas from the engine, and a compressor mounted on the same shaft as the turbine pressurizes the air supplied to the engine. Turbochargers are currently installed in a variety of engines. However, the flow rate of the exhaust gas varies with the speed of the engine's revolution. The flow rate of the exhaust gas which is actually supplied from the engine will not always be that needed to produce the ideal operating conditions for the supercharger. To rectify this situation and allow the turbocharger's capacity to be used to its best advantage, a variable-capacity turbocharger has been developed. In a variable-capacity turbocharger, the flow of the exhaust gas in the turbine compartment is regulated according to the operating state of the internal combustion engine.

This sort of variable-capacity turbocharger has a number of nozzle vanes on the nozzle unit of the turbine, which is inside a housing. FIG. 8 shows a partial cross section of the nozzle unit in a variable-capacity turbocharger belonging to the prior art.

In FIG. 8, turbine 228 is supported by bearings in a main housing of the variable-capacity turbocharger in such a way that it is free to rotate. The exhaust gas from the internal combustion engine flows into housing 220 through an intake port of the variable-capacity turbocharger. It is supplied to turbine 228 by way of scroll channel 226 which is formed in housing 220 and nozzle unit 210 which forms the inlet to the turbine 228. The exhaust gas supplied to turbine 228 is then exhausted through the exhaust port after it has driven the turbine 228.

Nozzle unit 210 comprises mounting plate 202, which is fixed to housing 220, and side plate 206, which is placed opposite mounting plate 202. A number of nozzle vanes 204 are placed at equal intervals along the circumference between the two plates. Side plate 206 is fixed to mounting plate 202 by supporting bolt 208, which goes through the plate 206. Nozzle vanes 204 have a shaft portion. They are mounted on mounting plate 202 in such a way that they are free to rotate with the shaft portion.

Because side plate 206 is fixed in place by support bolt 208, the heat of the exhaust gas which is supplied to the turbine raises its temperature, causing it to thermally deform. A space is provided between nozzle vanes 204 and side plate 206, as in FIG. 8, in order to prevent nozzle vanes 204 from catching or sticking during rotation and allow them to operate smoothly. This is why in variable-capacity turbochargers of the prior art a portion of the exhaust gas being supplied to scroll channel 226 is routed through the space between nozzle vanes 204 and side plate 206 and supplied to turbine 228 without going through the area around nozzle vanes 204. In the prior art design, then, because some of the gas is supplied to turbine 228 without passing through the channel around vanes 204, the efficiency of the variable-capacity turbocharger decreases.

SUMMARY OF THE INVENTION

This invention is to solve the shortcomings of the prior art design described above. The object of this invention is to minimize as much as possible or eliminate the quantity of exhaust gas supplied to the turbine without going through the channels between the nozzle vanes. This invention is also effective at minimizing the quantity of exhaust gas supplied to the turbine from behind the side plate without going through the nozzle unit.

A variable-capacity turbocharger which controls the opening degree of nozzle vanes has a turbine provided in a housing, which is free to rotate on a turbine shaft, a plurality of nozzle vanes arranged in nozzle units around the turbine in the housing, a link plate which rotates freely around the turbine provided in the housing, which is connected to the nozzle vanes by means of a plurality of levers, and which continuously moves the nozzle vanes synchronously between the open and closed positions, and an actuator outside the housing, which is connected to the link plate through a transmission mechanism. The turbocharger according to this invention is distinguished by the following features. It has a mounting plate fixed to the housing, and a side plate installed in a recess provided in the housing in such a way that the side plate can move in the recess, both of which are provided parallel to the turbine shaft. A pushing means pushes the side plate toward the mounting plate and a limiting means limits the movement of the side plate parallel to the turbine shaft toward the mounting plate.

The pushing means to push the side plate can be a pressure chamber created between the side plate and the recess, or a spring plate mounted between the side plate and the recess.

The side plate has a doughnut shape whose center is the turbine shaft. The recess has a diameter slightly greater than the diameter of the side plate, and the recess also has, on the inner surface, a round projection which protrudes parallel to the turbine shaft toward the side plate. The spring plate is engaged with and fixed to the round projection.

In these drawings, 10 is a turbine casing, 50 is an actuator, 52 is a rod, 54 is a link member, 104 is a nozzle vane, 106 is a side plate, 112 is a link plate, 116 is a spring plate, 114 is a lever, 120 is a swinging member, 130 is a bridge, 140 is a roller, and 150 is a pressure chamber.

DETAILED DESCRIPTION OF THE PREFERRED EMBODIMENTS

In this section we shall explain several preferred embodiments of this invention with reference to the appended drawings. The scope of the invention is not limited only to the parts shown, along with the shapes, relative positions and other aspects of the parts described in the embodiments, which are meant merely for the purpose of illustration.

In this section we shall explain two preferred embodiments of the invention with reference to the appended drawings.

Figure 1:
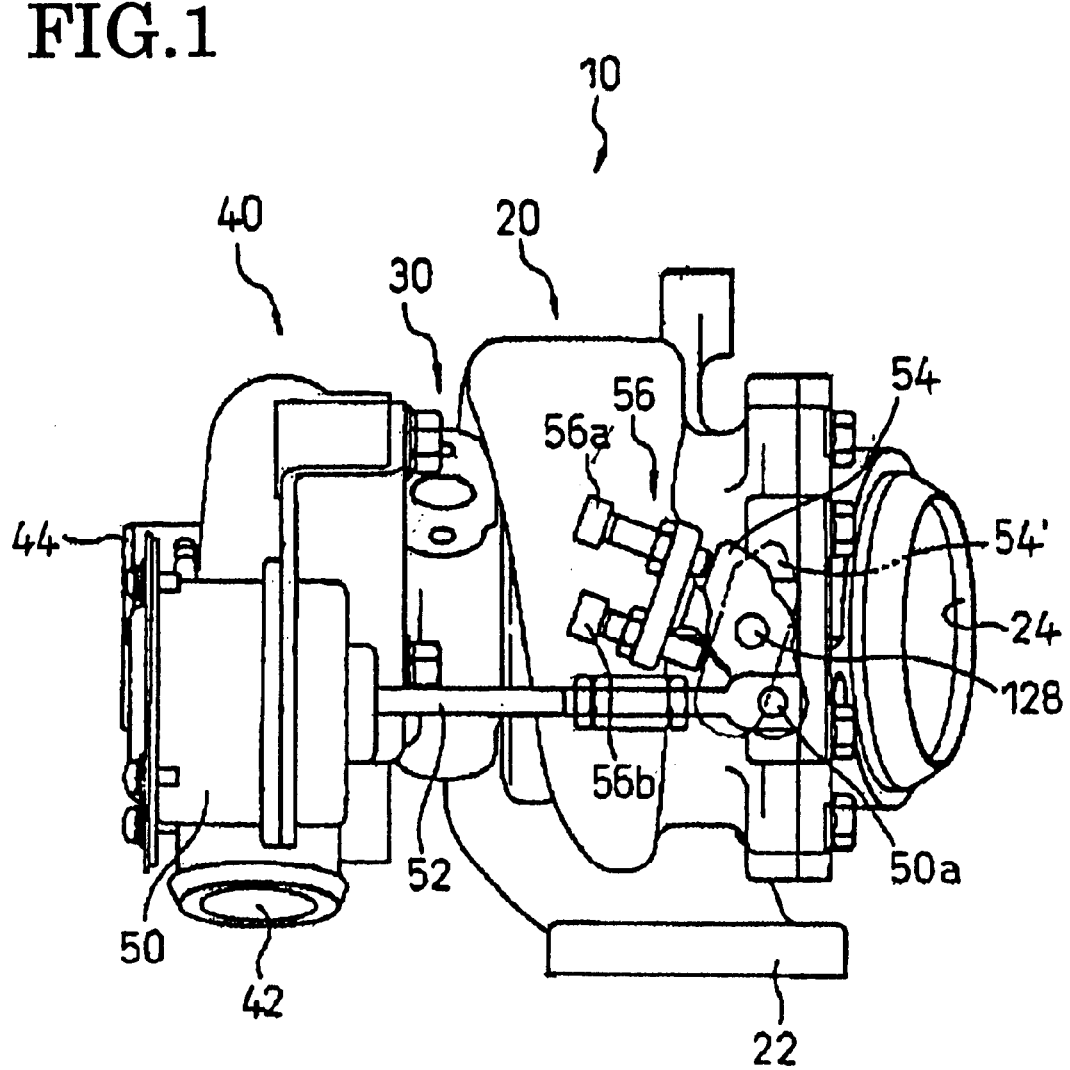
FIG. 1 is a lateral view of the exterior of a variable-capacity turbocharger in which this invention is implemented.

FIG. 1 illustrates the external appearance of a variable-capacity turbocharger 10 in which this invention has been implemented. Variable-capacity turbocharger 10 includes a housing, which comprises turbine housing 20, compressor housing 40 and main housing 30, which is between turbine housing 20 and compressor housing 40. Turbine housing 20 has an intake port 22 and an exhaust port 24. Compressor housing 40 has an intake port 44 and a discharge port 42.

On the outside of the housings 20, 30 and 40 is an actuator 50, which drives the nozzle vanes (to be explained shortly). Actuator 50 uses air pressure, or more specifically it uses the negative pressure of the air sucked into the internal combustion engine (not pictured) on which the variable-capacity turbocharger 10 is installed, to cause rod 52 to move forward and back.

Figure 2:
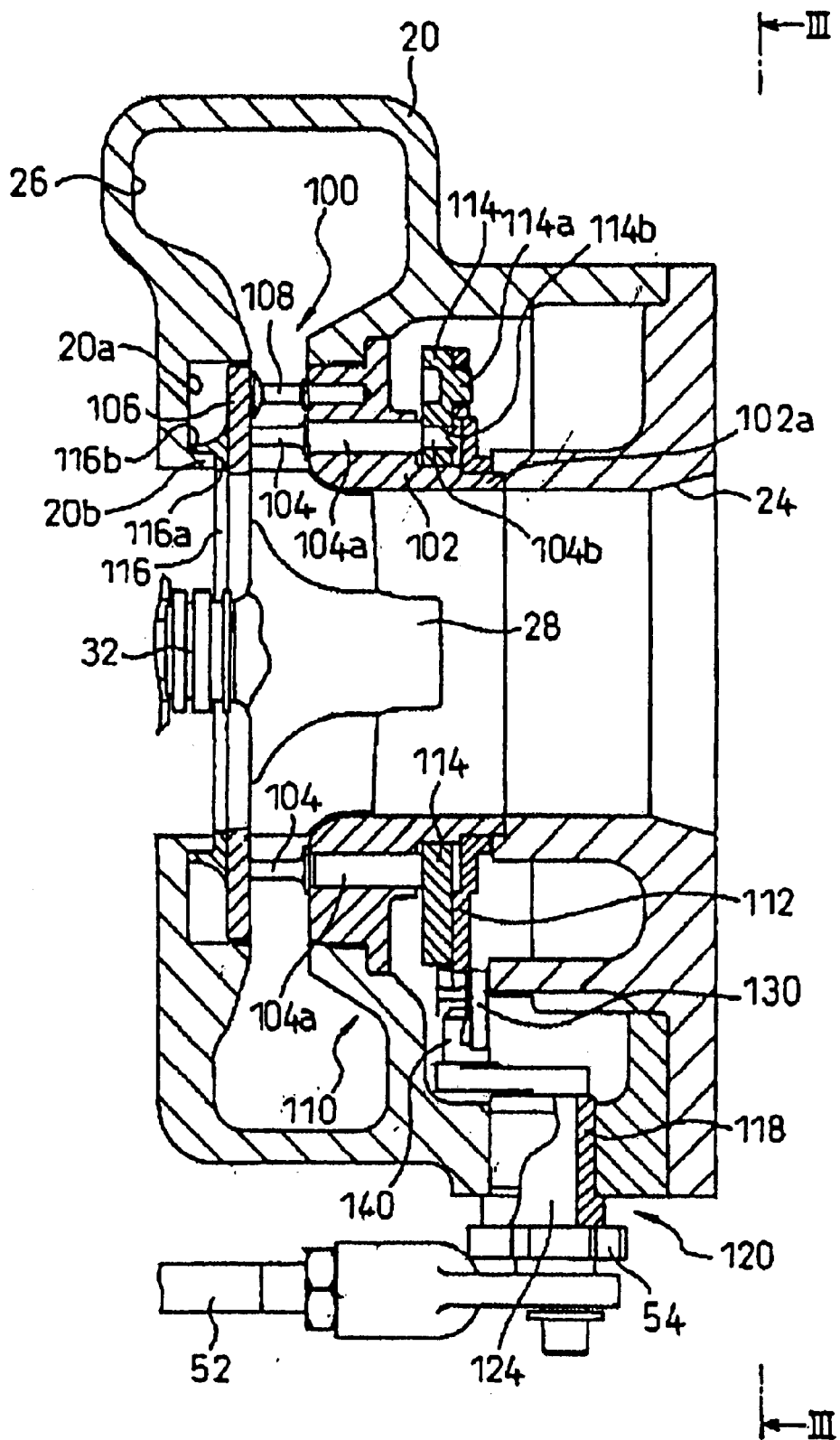
FIG. 2 is a cross section of a turbine compartment in the first preferred embodiment.

The turbine compartment, especially main housing, according to the first preferred embodiment is shown in FIG. 2. As can be seen in FIG. 2, turbine shaft 32 is supported in main housing 30 in such a way that it is free to rotate. Turbine 28, which is mounted to one end of turbine shaft 32, is inside turbine housing 20. The compressor impeller (not pictured), of course, is mounted to the other end of turbine shaft 32 in compressor housing 40. The exhaust gas from the internal combustion engine is conducted from intake port 22 into turbine housing 20. It is supplied to turbine 28 through scroll channel 26, which is created on the inside of turbine housing 20, and nozzle unit 100, which is the inlet to turbine 28. After it drives the turbine 28, the exhaust gas which was supplied is exhausted through exhaust port 24.

Nozzle unit 100 comprises mounting plate 102, which is fixed to turbine housing 20, and side plate 106, which faces mounting plate 102 and is mounted in the axial direction. A number of nozzle vanes 104 are placed between the two plates at regular intervals along the circumference of the shaft. Side plate 106 is a circular component which extends in a radial direction in a plane perpendicular to the axis of the shaft of turbine 28. It is mounted in such a way that it can move in the axial direction in recess 20a, a recess provided for it in turbine housing 20. In nozzle unit 100, a number of support bolts 108 are provided at regular intervals along the circumference of the shaft to serve as a stop or means to limit the movement of side plate 106 in the axial direction toward mounting plate 102.

As mentioned, in prior art designs a space is provided between side plate 106 and nozzle vanes 104 to accommodate the thermal deformation of side plate 106. With this embodiment, as shall be explained shortly, the difference in the dimensions of the outer diameter of side plate 106 and the inner diameter of recess 20a is the minimal difference which will still allow side plate 106 to move in the axial direction. The space between side plate 106 and nozzle vanes 104 thus effectively becomes nonexistent.

A spring plate 116 is provided between side plate 106 and turbine housing 20 as a pushing means to push the side plate. Spring plate 116 has an annular portion 116a, which is on a surface roughly perpendicular to the axis of turbine 28, and a cylindrical mounting portion 116b, which extends in the axial direction toward turbine 28 from the inner edge of the flange 116a. Annular portion 116a of spring plate 116 is in contact with the back of side plate 106, i.e., the surface of side plate 106 which is opposite nozzle unit 100. Mounting portion 116b engages with annular projection 20b which protrudes from the surface of recess 20a in the axial direction toward side plate 106.

Figure 3:
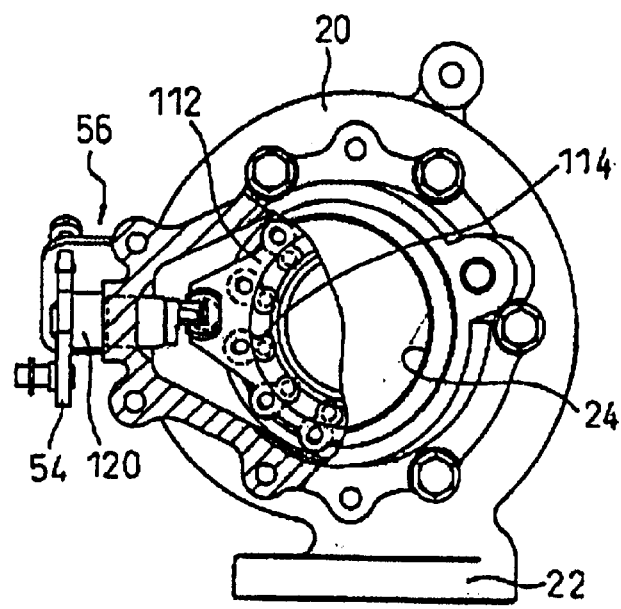
FIG. 3 is a partially cut away frontal view of the variable-capacity turbocharger in FIG. 1.
Figure 4:
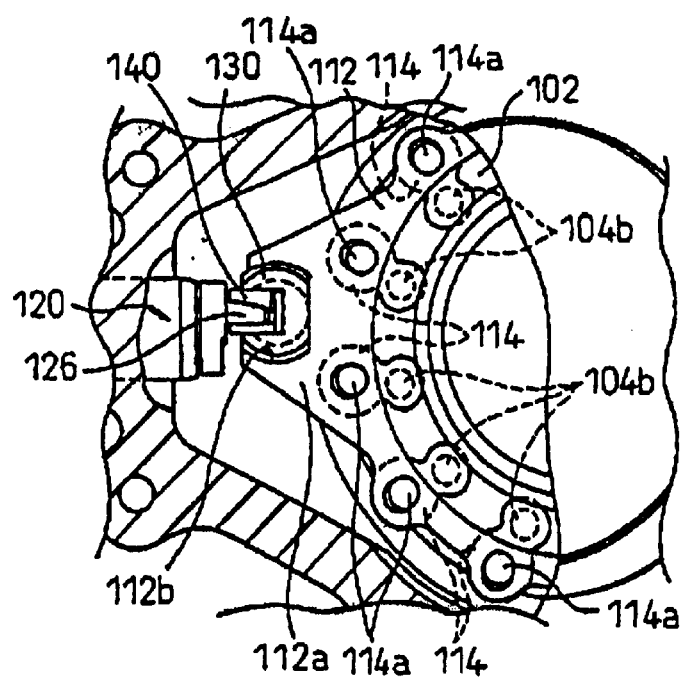
FIG. 4 is an enlargement of a portion of FIG. 3. It shows a transmission mechanism which transmits the action of an actuator to a link plate and the elements which link the two.

At the base of nozzle vanes 104 is shaft portion 104a, which is mounted to mounting plate 102 so that portion 104a is free to rotate the vanes between the open and closed positions. As shown in FIGS. 3 and 4, an end 104b of each shaft portion 104a of nozzle vane assembly 104 goes through mounting plate 102 in the axial direction. The shafts are connected to various levers 114 which correspond to the nozzle vanes. (See FIGS. 3 and 4). The nozzle vane 104 rotates via nozzle shaft 104a according to the rotation of lever 114. Each lever 114 has a hole 114b to receive the end 104b of one of the shaft portions 104a and a boss or shaft portion 114a on the side opposite the hole 114b.

The shaft 114a of lever 114 can slide within an oblong hole 112d provided at regular intervals along the circumference of link plate 112. As shown in FIG. 2, there is a cylindrical boss 102a on the side of mounting plate 102 opposite nozzle unit 100. The annular link plate 112 (See FIG. 5) is mounted to the boss 102a so that it is free to rotate on the rotational axis of turbine 28. Link plate 112 has a series of oblong holes 112d at regular intervals along its circumference to receive the shaft portions 114a of levers 114. Further, link plate 112 has, on the same surface, a trapezoidal elongated portion 112a on one side. The end of the elongated portion 112a is divided into two portions to form locking arms 112c. The two arms 112c form a rectangular recess 112b.

The variable-capacity turbocharger 10 of this embodiment also has a transmission mechanism to transmit the action of the actuator 50 to link plate 112 as shown in FIGS. 1 and 2. The transmission mechanism includes rod 52 of actuator 50, link member 54 (see FIG. 1), which is connected to the end of rod 52 by pin 50a, swinging member 120 (see FIGS. 2 and 6), which is connected to the link member 54, and roller 140 and bridge 130, which are between member 120 and link plate 112, and which serve to connect the transmission mechanism to link plate 112.

Figure 6:
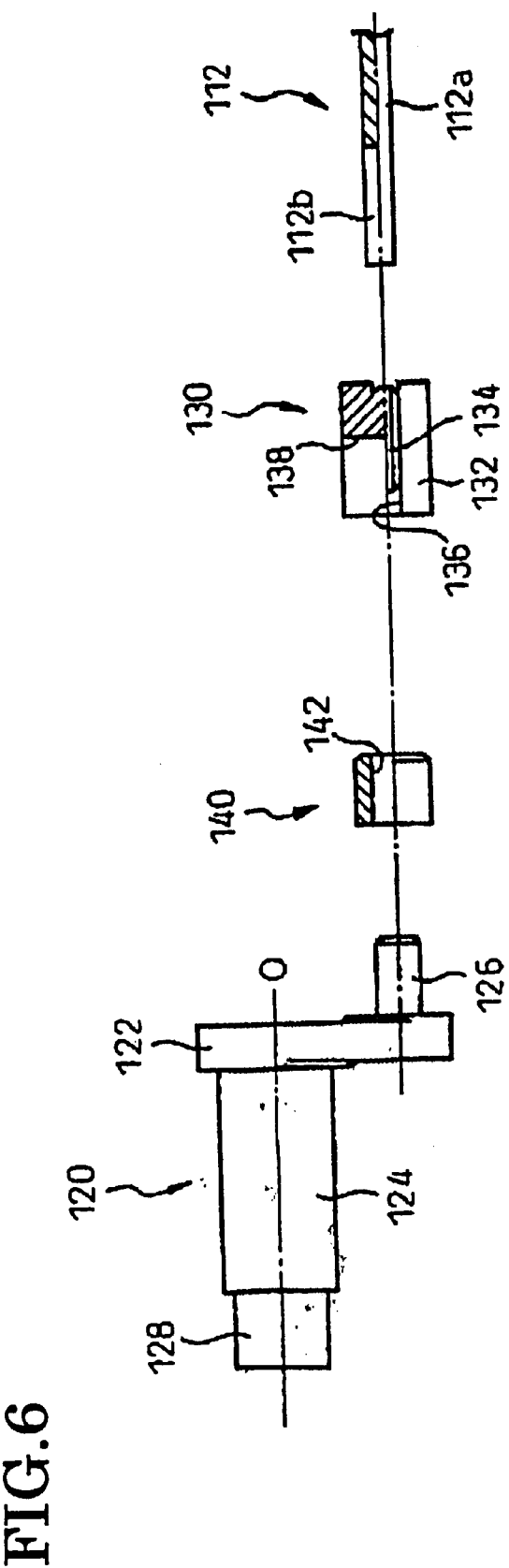
FIG. 6 is an exploded view of the transmission mechanism to transmit the action of the actuator to the link plate.

As can be seen in FIG. 6, swinging member 120 comprises arm 122, shaft 124, which extends along a given axis O from one end of arm 122, and is supported by turbine housing 20 through sleeve 118 in such a way that it can freely rotate, connector 128, which is on the end of shaft 124 and coaxial with it, and connected to link member 54 in such a way that it cannot move relative to the link member, and pin 126, which extends from the side of arm 122 opposite shaft 124 and is parallel to that shaft. Swinging member 120 may be made of a metallic material, for example, stainless steel. Ideally, it should be formed of a single piece of austenitic stainless steel. Swinging member 120, arm 122, shaft 124, connector 128 and pin 126 may be formed separately and welded together.

Bridge 130 comprises two flat plates 132, which are positioned parallel to each other with a slight gap between them, and center unit 134, which connects the two plates 132. At the center unit 134 provided between the two plates 132 is a groove 136 in which the locking arms 112c of link plate 112 engage. Part of bridge 130, including center unit 134, is removed to the middle of the bridge to form cut-away portion 138. The two opposed surfaces are parallel and slide against each other. As can be seen in FIG. 6, when the transmission mechanism is assembled, the locking unit is formed when cut-away portion 138 goes into roller 140, which is mounted on pin 126 of swinging member 120. Bridge 130 may be made of a metallic material, for example, austenitic stainless steel.

As shown in FIG. 6, roller 140 is roughly cylindrical, with the diameter of it's opening slightly larger than the exterior diameter of pin 126. The exterior diameter of the roller is slightly smaller than the gap between the sliding surfaces 138 of bridge 130. Roller 140 may be made of a metallic material, for example, martensite stainless steel.

In this section we shall explain how this embodiment operates.

When the internal combustion engine operates, as shown in FIG. 1, a negative intake pressure is created according to its rate of revolution and the openness of its throttle, and then the pressure is controlled by a magnetic valve to transmit it to the actuator 50. The actuator 50 operates according to this pressure. Rod 52 moves forward and back in the axial direction (to the right and left in FIG. 1) according to the magnitude of the negative intake pressure. When rod 52 operates, link member 54 rotates on shaft 124 of swinging member 120 in response. As can be seen in FIG. 1, link member 54, which is shown by solid lines, is in contact with bolt 56a on the top of stop 56. At this point nozzle vanes 104 are in the open position, the position which produces the maximum nozzle opening. When the engine is operating at low r.p.m., or the throttle is only slightly open, actuator 50 draws back rod 52. As rod 52 draws as far back as it can go, link member 54 moves into a position in which it is in contact with bolt 56b on the lower portion of stop 56, as shown by the dotted lines. At this point nozzle vanes 104 are in the position which produces the smallest nozzle opening.

Figure 5:
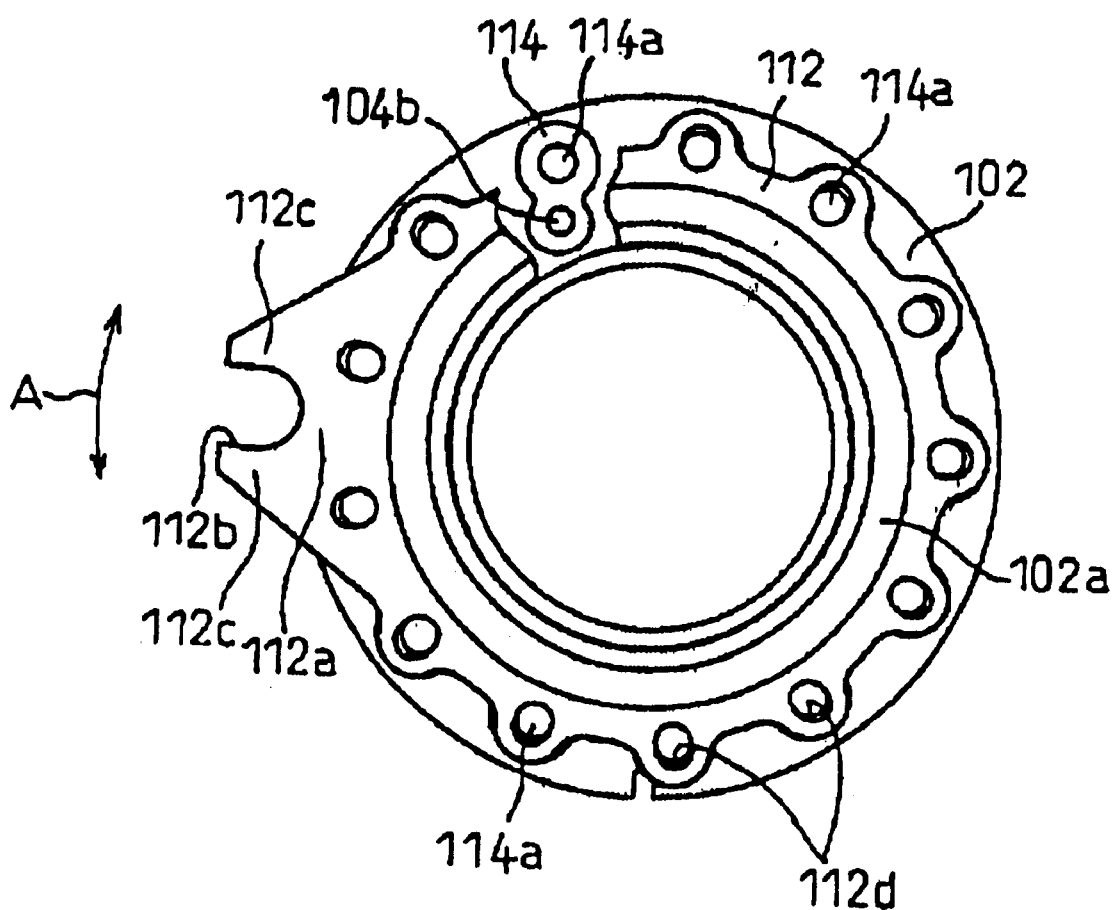
FIG. 5 is a plan view of the link plate.

In this way the linear movement of rod 52 is converted by link member 54 into the swinging motion of swinging member 120. Pin 126 of member 120 moves in an arc around axis O of shaft 122 as shown in FIGS. 4 and 5. At this point pin 126 and roller 140 are in cut-away portion 138 in bridge 130, and the pin is between roller 140 and a surface. It slides upward and downward against bridge 130 in the relationship shown in FIG. 6, i.e., it slides along the axis of rotation of turbine 28. At the same time link plate 112 rotates around the circumference of boss 102a on mounting plate 102, with the rotary axis of turbine 28 as its center. When link plate 112 rotates, lever 114, which is connected to link plate 112, rotates along with nozzle vanes 104 with shaft 104a of vanes 104 as its center.

As has been discussed, in prior art designs a space is provided between side plate 106 and nozzle vanes 104 to accommodate the thermal deformation of side plate 106. For this reason prior art designs allowed a portion of the exhaust gas which should have gone into the channel between scroll channel 26 and nozzle vanes 104 to bypass the area between side plate 106 and nozzle vanes 104, i.e., the channel formed by nozzle vanes 104, and be supplied directly to turbine 28. This causes the efficiency of variable-capacity turbocharger 10 to decrease.

In the prior art design, side plate 206 was fixed to mounting plate 202 by support bolt 208. To accommodate the thermal deformation which occurred when the temperature of side plate 206 rose, a space had to be left between side plate 206 and nozzle vanes 204. A portion of the exhaust gas was conducted from the channel between the exterior surface of the side plate and the interior surface of the recess for the side plate along the outside or back of the side plate, i.e., along the surface of the side plate's main housing 30. This gas was supplied to the turbine without passing through nozzle unit 100. This too caused the efficiency of variable-capacity turbocharger 10 to decrease. It was very difficult in the prior art to reduce the quantity of gas diverted in this way.

With this embodiment according to this invention, side plate 106 is mounted in recess 20a so that it can move in the axial direction. Its position is determined by spring plate 116, which pushes against it toward support bolt 108. Thus even if side plate 106 should become hung up in the radial direction in recess 20a, it will still be able to move in the axial direction. The thermal deformation of side plate 106 is absorbed within its axial movement. This allows the space between side plate 106 and nozzle vanes 104 to be essentially eliminated.

Figure 8:
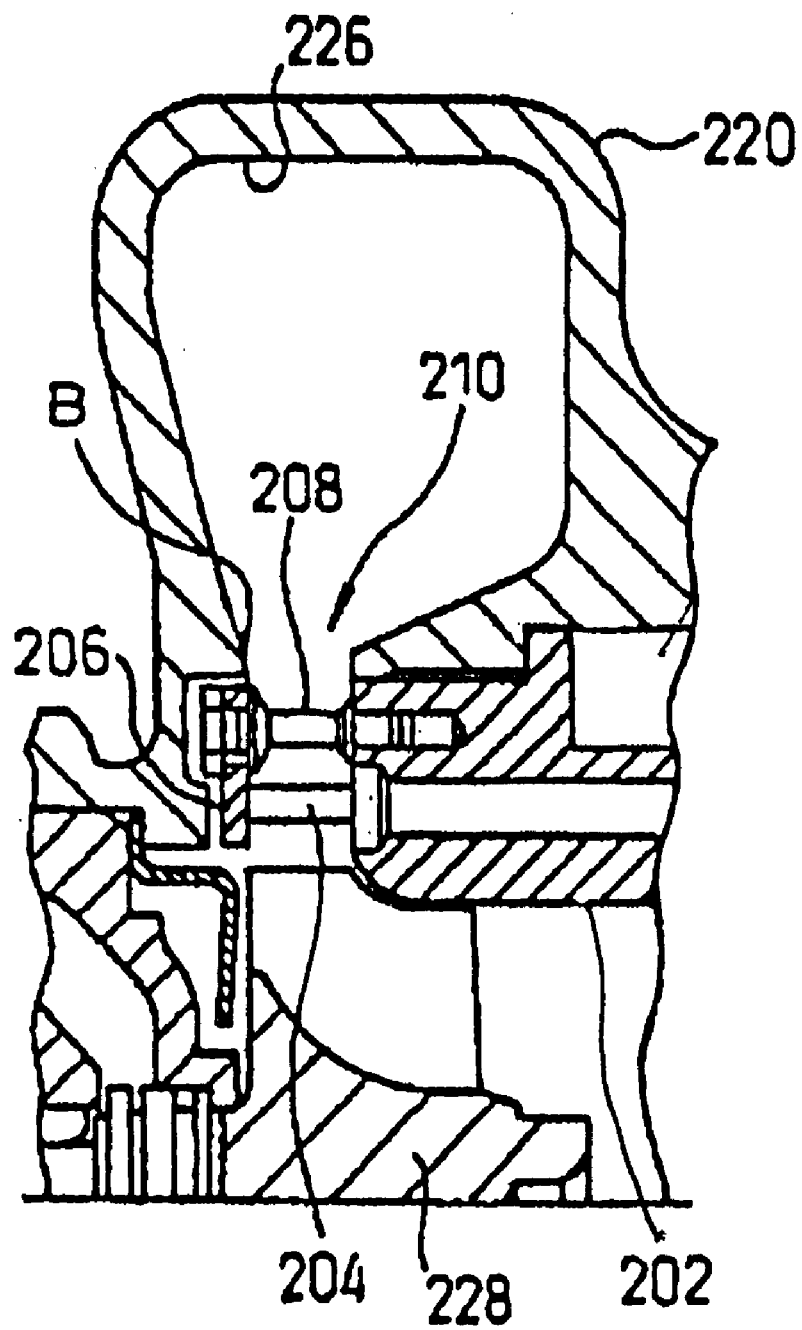
FIG. 8 is a partial enlarged cross section of a nozzle unit belonging to the prior art.

In the embodiment we have been discussing, instead of side plate 206 being fixed to mounting plate 202 by support bolt 208 as in the previous art (see FIG. 8), the position of side plate 106 with respect to mounting plate 102 is determined by allowing it to move in the axial direction. Thus the thermal deformation of side plate 106 is absorbed within its axial movement. When side plate 106 engages in recess 20a, it is immobilized in its radial direction. Spring plate 116 pushes it toward support bolt 108 and immobilizes it in the axial direction. Thus side plate 106 is held in position with respect to mounting plate 102. In the axial direction, the only force operating on side plate 106 in the direction of support bolt 108 is provided by spring plate 116. Thus the thermal deformation of side plate 106 is absorbed by its axial movement.

The pushing means used to push side plate 106 against support bolt 108 to support bolt 108 need not be limited to the spring plate 116 shown in FIG. 2. Any means may be used which pushes side plate 106 toward support bolt 108 while allowing it to move in the axial direction.

Figure 7:
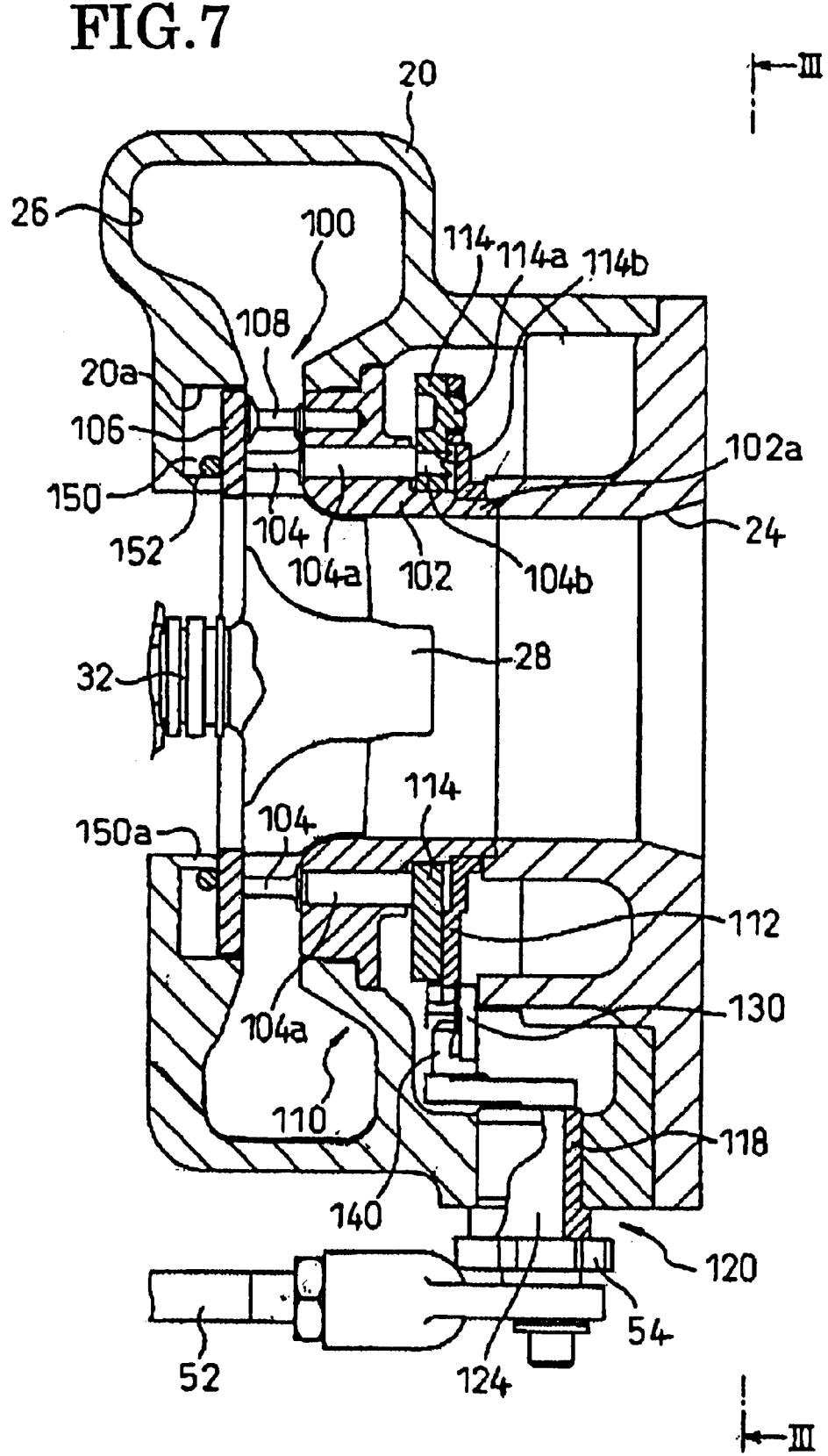
FIG. 7 is a cross section of the turbine compartment in the second preferred embodiment of this invention.

The second preferred embodiment according to this invention is shown in FIG. 7. In this embodiment, all aspects of the configuration aside from the pushing means to push the side plate are identical to those of the previous embodiment, so we shall not discuss them further, but shall explain only those aspects which are different. Elements in FIG. 7 which are identical to those in the previous embodiment have been given the same reference number.

In FIG. 7, recess 20a of turbine housing 20 contains side plate 106 and pressure chamber 150, which form the pushing means to push the side plate. If we compare annular projection 150a in the embodiment in FIG. 7 with the annular projection 20b in the embodiment in FIG. 2, we see that the former is substantially longer in its axial dimension so that it comes in contact with the back of side plate 106. In the embodiment in FIG. 7, just as in the previous embodiment shown in FIG. 2, the difference between the dimensions of the interior diameter of recess 20a and exterior diameter of side plate 106 is the smallest possible difference which will allow side plate 106 to move in the axial direction. However, in order to completely prevent the exhaust gas from leaking out of the space, the pressure in the pressure chamber is made greater than that of nozzle unit 100. As a result, side plate 106 is pushed toward support bolt 108 just as in the embodiment in FIG. 2. To make the pressure in chamber 150 even higher, an annular seal 152 may be provided between annular projection 150a and the rear surface of side plate 106.

What is claimed is:

1. A variable-capacity turbocharger which controls an opening degree of nozzle vanes, comprising:

a turbine provided in a housing, said turbine being free to rotate on a turbine shaft;

a nozzle unit comprising a plurality of nozzle vanes arranged around said turbine in said housing;

a link plate which is provided in said housing and which is freely rotatable around said turbine, said link plate being connected to said nozzle vanes by a plurality of levers and operable to move said nozzle vanes between open and closed positions; and an actuator which is outside of said housing and which is connected to said link plate through a transmission mechanism;

wherein said nozzle unit further comprises:

a mounting plate fixed to said housing and a side plate provided in a recess in said housing such that said side plate is movable in said recess, said nozzle vanes extending from said mounting plate toward said side plate;

a spring plate pushing said side plate toward said mounting plate within said recess and absorbing thermal deformation of said side plate, wherein said recess limits movement of said side plate due to thermal deformation in a radial direction of said turbine while allowing movement of said side plate in an axial direction of said turbine; and a support bolt arranged to limit movement of said side plate toward said mounting plate in a direction parallel to said turbine.

2. A variable-capacity turbocharger which controls an opening degree of nozzle vanes, comprising:

a turbine provided in a housing, said turbine being free to rotate on a turbine shaft;

a nozzle unit comprising a plurality of nozzle vanes arranged around said turbine in said housing;

a link plate which is provided in said housing and which is freely rotatable around said turbine, said link plate being connected to said nozzle vanes by a plurality of levers and operable to move said nozzle vanes between open and closed positions;

an actuator which is outside of said housing and which is connected to said link plate through a transmission mechanism;

wherein said nozzle unit comprises:

a mounting plate fixed to said housing and a side plate provided in a recess in said housing such that said side plate is movable in said recess;

a pressure chamber between said side plate and said recess operable to push said side plate toward said mounting plate; and a limiting means for limiting movement of said side plate parallel to said turbine shaft toward said mounting plate.

3. A variable-capacity turbocharger which controls an opening degree of nozzle vanes, comprising:

a turbine provided in a housing, said turbine being free to rotate on a turbine shaft;

a nozzle unit comprising a plurality of nozzle vanes arranged around said turbine in said housing;

a link plate which is provided in said housing and which is freely rotatable around said turbine, said link plate being connected to said nozzle vanes by a plurality of levers and operable to move said nozzle vanes between open and closed positions;

an actuator which is outside of said housing and which is connected to said link plate through a transmission mechanism;

wherein said nozzle unit comprises:

a mounting plate fixed to said housing and a side plate provided in a recess in said housing such that said side plate is movable in said recess;

a spring plate mounted between said side plate and said recess operable to push said side plate toward said mounting plate; and a limiting means for limiting movement of said side plate parallel to said turbine shaft toward said mounting plate.

4. The variable-capacity turbocharger of claim 3, wherein said side plate has a doughnut shape centered on said turbine shaft, said recess has a diameter slightly greater than the diameter of said side plate, said recess has an annular projection on an inner surface thereof which protrudes parallel to said turbine shaft toward said side plate, and said spring plate is engaged with and fixed to said round projection.

5. A variable-capacity turbocharger, comprising:

a turbine provided in a housing, said turbine being free to rotate on a turbine shaft;

a nozzle unit comprising:

a plurality of nozzle vanes arranged around said turbine, a mounting plate fixed with respect to said housing, said nozzle vanes being mounted on said mounting plate, a side plate provided in a recess of said housing so as to be movable in said recess, and said nozzle vanes extending from said mounting plate toward said side plate, a pushing mechanism in said recess operable to push said side plate toward said mounting plate such that space between said side plate and said nozzle vanes is essentially eliminated, and a stop operable to limit movement of said side plate in a direction parallel to said turbine shaft and toward said mounting plate;

a link plate provided in said housing wherein said link plate is rotatable around said turbine, and said link plate is connected to said nozzle vanes by a plurality of levers and operable to move said nozzle vanes between open and closed positions; and an actuator outside of said housing and connected to said link plate through a transmission mechanism.

6. The variable-capacity turbocharger of claim 5, wherein said pushing mechanism comprises a pressure chamber between said recess and said side plate.

7. The variable-capacity turbocharger of claim 5, wherein said pushing mechanism comprises a spring plate mounted between said recess and said side plate.

* * * * *